Nov. 4, 1969  D. M. WILLYOUNG  3,476,966
RETAINING RING LOCKING STRUCTURE
Filed Nov. 14, 1967  3 Sheets-Sheet 1
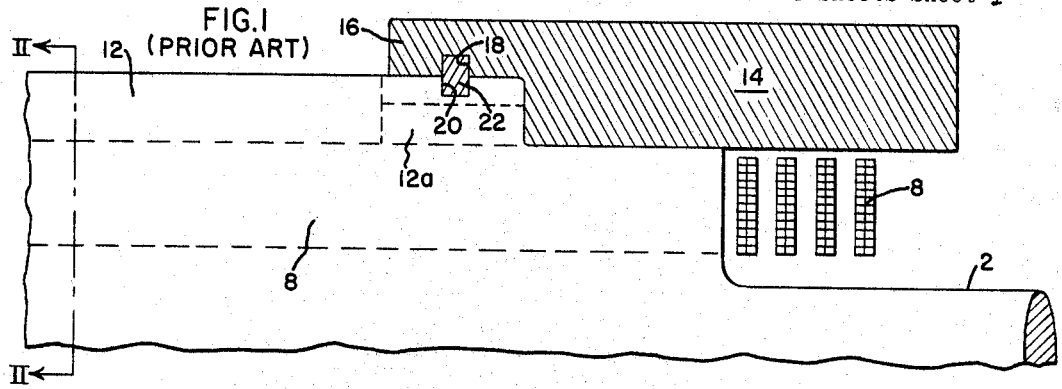
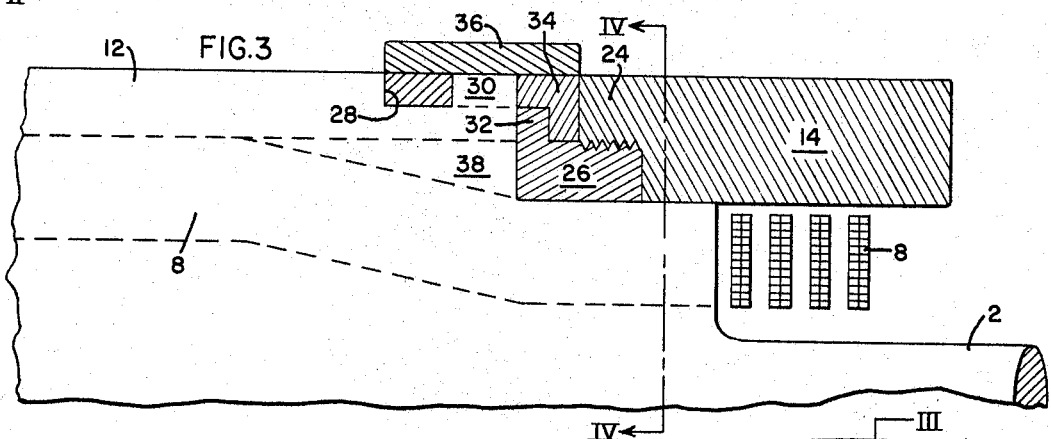
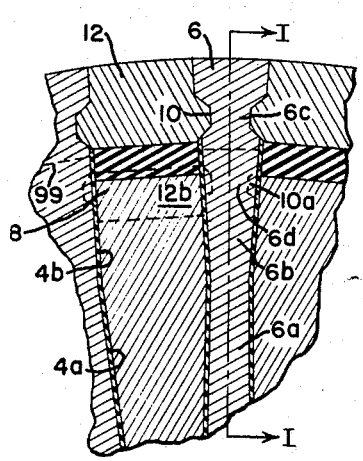
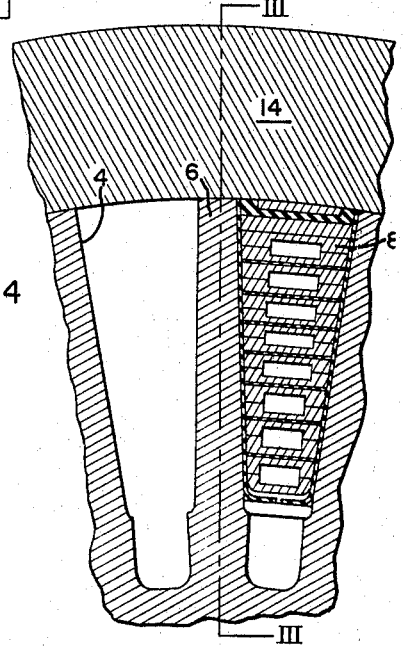
INVENTOR:
DAVID M. WILLYOUNG,
BY  *Robert J. Bird*
HIS ATTORNEY.

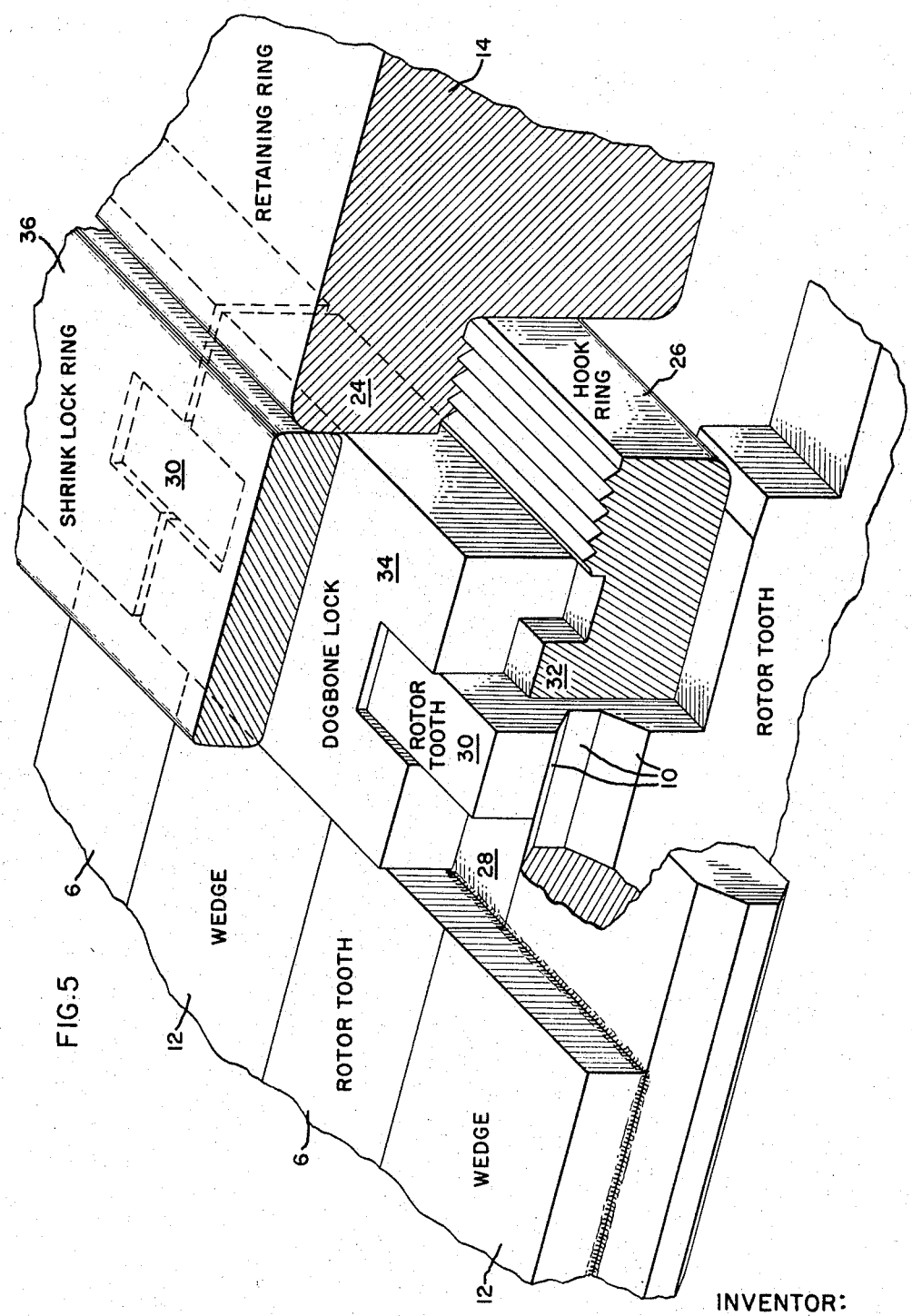

Nov. 4, 1969  D. M. WILLYOUNG  3,476,966
RETAINING RING LOCKING STRUCTURE
Filed Nov. 14, 1967  3 Sheets-Sheet 3

INVENTOR:
DAVID M. WILLYOUNG,
BY Robert J Bird
HIS ATTORNEY.

United States Patent Office 3,476,966
Patented Nov. 4, 1969

3,476,966
RETAINING RING LOCKING STRUCTURE
David M. Willyoung, Scotia, N.Y., assignor to General Electric Company, a corporation of New York
Filed Nov. 14, 1967, Ser. No. 682,926
Int. Cl. H02k 3/46
U.S. Cl. 310—270    5 Claims

ABSTRACT OF THE DISCLOSURE

A dynamoelectric machine rotor retaining ring has a circumferential keyway which provides a locking means in conjunction with a keyseat in the rotor teeth and locking members. A locking ring surrounds the locking members to complete the retaining ring locking structure.

BACKGROUND OF THE INVENTION

This invention relates to an improved rotor construction for dynamoelectric machines of very large rating. More particularly, it relates to a new arrangement for the mounting and locking in place of the retaining rings on each end of the rotor of such dynamoelectric machines.

The continuing trend in the power generation industry is toward generators of increased capacity. This has been done by utilizing higher current loadings, improved cooling of the current-carrying parts, and by increased physical size of the electromagnetic structure. There are many obstacles which limit the physical dimensions of a generator, including considerations of transportation and the strength of available materials for the rotating parts. Foremost in the latter category is the mtaerial for the retaining rings, which are the most highly stressed of the rotating parts in a dynamoelectric machine.

Typically, the retaining rings consist of massive cylinders of a nonmagnetic steel which are tightly fitted over the ends of a generator rotor to support the centrifugal load of the rotor windings at their end portions where they extend out of their rotor slots. The centrifugal force acting upon a retaining ring by the supported structure when a generator is running at rated speed typically accounts for only one-fourth to one-third of the total hoop stress on the retaining ring, the remainder arising from the centrifugal force of the ring mass itself. This major part of the total ring stress increases as the square of the mean diameter of the retaining ring. At present, with available materials, and the normal retaining mounting construction used for very large generators, as shown in U.S. Patent No. 2,960,360, issued to H. D. Taylor, the rotor diameter for two-pole, 3600 r.p.m. generators is limited by the allowable stress to approximately 40", or slightly higher.

The maximum generator capability would be increased substantially if a larger diameter rotor could be used because, among other reasons, the total cross-sectional area of the shaft available for carrying the magnetic flux and the rotor windings would be increased. However, if the retaining rings were enlarged along with the rotor body diameter, they would reach a point (on the order of 47" diameter for a 3600 r.p.m. rotor) at which they could carry no load. That is, they could withstand no hoop stress additional to that arising from their own mass.

U.S. Patent 3,395,299 issued on July 30, 1968 to R. Quay and D. M. Willyoung and assigned to the assignee of the present invention, discloses a recently developed rotor and retaining ring structure in which the rotor body has an increased diameter over most, or all, of its active magnetic length (thereby producing increased kva. per inch of rotor body length), with a smaller diameter section at each end, the conductors being formed with a downset into the rotor body very near the ends so that (a) the retaining ring diameter and retaining ring stresses are not correspondingly increased, and (b) the rotor body tooth and body bursting stresses are little if any higher at the reduced diameter end sections than on the central portion of the rotor. The problem of locking the retaining ring securely in place against axial coil expansion forces is met in this design by utilizing a peripherally rotated locking key, of the type described in the aforementioned Taylor patent, and a short section of downset coil slot wedges at the ends of the coil slots to provide support for the centrifugal force of the rotor coils over the region where the locking keys are located. These downset coil slot wedges must be dovetailed into the ends of the rotor teeth, which in turn must have enough cross section between the dovetails to support the maximum centrifugal load which is imposed. To provide sufficient tooth cross section at the downset coil wedge dovetails a coil slot cross section which was trapezoidal at the bottom but rectangular at the top was necessary, even though a fully tapered slot, with uniform width (or close to uniform width) rotor teeth would have provided more space for the rotor coils and therefore greater rotor capability, if it were possible.

In a logical extension of the principle shown in the above-mentioned U.S. Patent 3,395,299, a large diameter rotor may have its conductor slots downset in the end portions to an even greater extent such that the teeth which define the longitudinal slots are thinned down at the rotor ends. This aggravates the problem of providing sufficient tooth section between the downset dovetails for this prior construction, of course.

Accordingly, one object of the present invention is to provide a locking structure for a retaining ring enabling it to be secured from axial movement relative to a generator rotor regardless of the presence or absence of rotor connecting structure radially inward of the ring.

Another object is to provide a retaining ring locking structure which will permit rotors with downset end windings to be used with fully tapered coil slots and therefore more copper in the coil cross section.

Another object is to provide a retaining ring locking structure which will permit generators of increased diameter to have an increased degree of downsetting of their end windings.

Other objects, advantages and features of the present invention will become apparent from the following description thereof when taken in connection with the accompanying drawing.

SUMMARY OF THE INVENTION

Briefly stated, the present invention is practiced by a dynamoelectric machine rotor and retaining ring, the rotor having downset end portions, the retaining ring being anchored to the rotor by an external keyway around the ring and locking members extending axially from the ring keyway to the rotor teeth at points of major diameter thereof.

DRAWING

In the drawing:

FIG. 1 is a longitudinal cross section of a generator end portion, representative of the prior art, and taken along line I—I of FIG. 2.

FIG. 2 is an axial cross section taken along line II—II of FIG. 1.

FIG. 3 is a longitudinal somewhat schematic cross section of a generator end portion according to the present invention, and taken along line III—III of FIG. 4.

FIG. 4 is an axial cross section taken along line IV—IV of FIG. 3.

FIG. 5 is a perspective of the generator end portion shown in FIG. 3.

Figure 6:
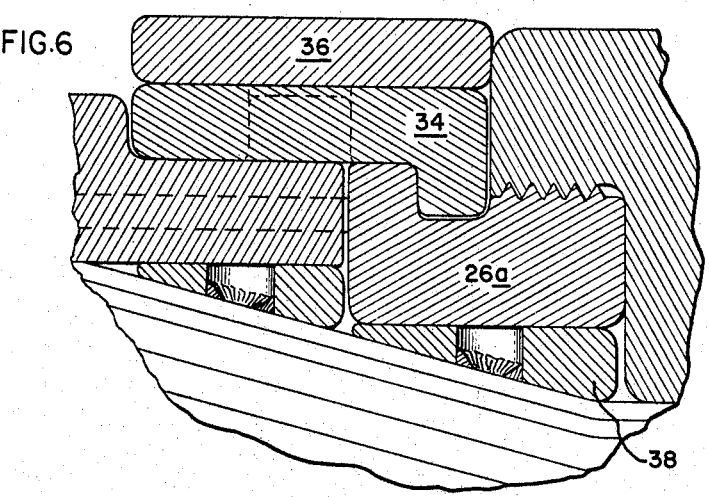
Figure 7:
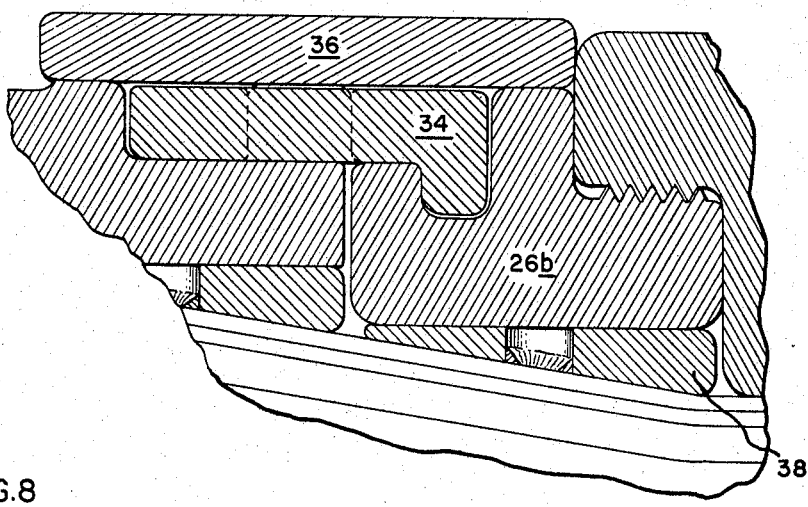
Figure 8:
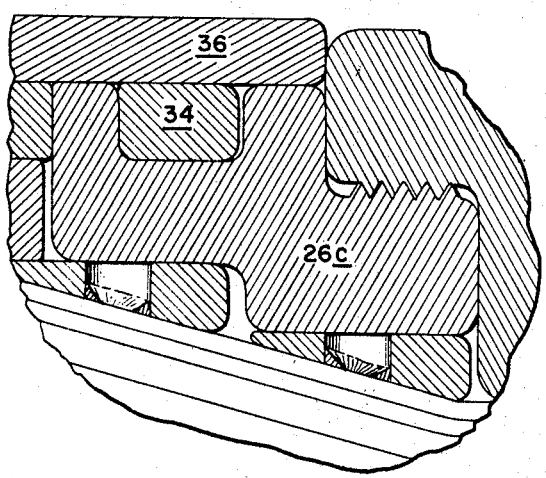

FIGS. 6, 7, and 8 are longitudinal cross sections showing modifications of one element of the present invention.

DESCRIPTION

Referring now to FIGS. 3 and 4 a generator rotor is generally indicated at 2. Rotor 2 is a substantially cylindrical member having longitudinal slots 4 milled therefrom so as to define longitudinal teeth 6. Conductor bars 8 extend longitudinally within the generator slots 4 from one end of the rotor to the other. Throughout most of their length, rotor teeth 6 define dovetails 10 for the accommodation of wedge members 12 which are disposed radially outward of the conductor bars 8 for the purpose of holding them in place during operation. At the rotor end portions, where the windings leave the slots 4, the windings 8 are restrained from radial movement under the effect of centrifugal force by a retaining ring 14 on each end of the rotor. This is known and typical of the prior art as shown in FIG. 1.

In the prior art, as shown in FIG. 1, wherein like numbers designate like elements, these retaining rings 14 are fit over the rotor ends by a shrink fit around the rotor forging and immediately radially outward of the conductor bars 8. These rings 14 have an extension or lip portion 16 having a circumferential keyway 18 machined therefrom. Correspondingly, the rotor teeth have a keyway 20 circumferentially machined therefrom. A reduced height coil wedge, 12a, is used over the end section of the coil slot extending approximately over the same axial distance as lip 16. A key member 22 extends circumferentially around the rotor body between retaining ring lip 16 and the body within keyways 18 and 20 to prevent any relative axial movement between the rotor body and the retaining ring 14. Obviously, this structure necessitates rotor teeth extending radially outward beyond the conductor bars for the accommodation of keyway 20. This prior art method of locking a retaining ring is more fully described in U.S. Patent No. 2,960,360—Taylor.

The prior art form of rotor slot cross-section is also shown in FIG. 2, composed of a lower, trapezoidal portion 4a, and an upper rectangular portion 4b, with dovetail surfaces 10, to support coil slot wedges 12. These slots define the contour of the rotor teeth 6, made up of an innermost section 6a, of uniform or nearly uniform width, and an upper section 6b, characterized by an increasing width with increasing radius, thereby providing ample tooth cross section at the dovetails 6c, for supporting the imposed centrifugal load. When the rotor coil ends were downset, as described in above-mentioned U.S. Patent 3,395,299, the rotor outside diameter was reduced for a short section at each end, as shown by dotted contour 99, and short lower dovetails 10a were provided to accommodate a short downset wedge 12b, corresponding to the reduced height wedge 12a in the non-downset case shown in FIG. 1.

Now referring again to FIGS. 3 and 4, it may be seen that in order to increase the slot area available for winding copper, the slot is uniformly tapered along its full depth and that conductor bar 8 is downset in the rotor end portion before emerging from the slot 4. The result is that the rotor teeth 6 become narrowed and dovetails 10a are eliminated therefrom. This makes it impossible to use the Taylor locking method. Therefore, in order to anchor the retaining ring from relative axial movement, it is necessary to reach beyond the retaining ring in an axial direction to a point of larger rotor diameter where the rotor teeth extend radially beyond the conductor. In FIG. 3, ring 14 is shrunk onto the end of rotor body 2 and has a threaded portion 24 extending axially therefrom. A hook ring 26 is preassembled to the retaining ring 14 by threads which mate with the threaded extending portion 24. A keyseat 28 is machined from each rotor tooth 6, at a point of largest diameter, so that the totality of all the keyseats 28 is a circumferential keyseat extending around the rotor. The removal of keyseat 28 leaves abutments or anchor points 30 on the end of each of the rotor teeth 6. Hook ring 26 similarly has an anchor means or flange 32 extending circumferentially therearound.

A locking means in the form of a "dogbone lock" 34, shaped like an H and shown more clearly in FIG. 5, is placed over adjacent anchor points 30, and into keyseat 28 and behind flange 32 to hold hook ring 26 and retaining ring 14 relative to rotor body 2. This is repeated continuously around the circumference of keyseat 28 and flange 32. To hold these dogbone locks 34 in place, a lock ring 36 is shrunk around the rotor and around lock members 34. It will be apparent that lock ring 36 carries only the centrifugal load exerted by the lock members 34, the hook ring 26 and retaining ring 14 carrying the load exerted by the windings.

Member 38 in FIG. 3 is a shim, which abuts the wedge 12 and is joined to the top conductor in the coil 8 throughout its radial transition from the full diameter position to its downset position. It serves to support the conductor and provide a slip surface against wedge 12 for the thermal expansion motions. Shim 38 may be a single piece as shown in FIG. 3 or it may be a plurality of smaller members. Depending on the number of shims 38 and the length and degree of the downset transition, the hook ring members 26 may have various forms. FIGS. 6, 7 and 8 show respectively alternative hook rings 26a, 26b, and 26c. The essential thing about hook rings 26, no matter which modification is employed, is that they must have a means to connect to retaining ring 14 and a flange or anchor means to connect with dogbone locks 34. It is furthermore within the contemplation of this invention to have retaining ring 14 and hook ring 26 a single piece. However, it is recognized and has been shown by calculation that this can only be done if the retaining ring material has great resistance to plastic fatigue strain, since low cycle fatigue strains, well into the plastic range, will appear in the combined member 14–26 for each cycle of bringing the rotor to speed and returning to standstill, due to the changing equilibrium shape of the assembly for various speeds. It is for this reason that the preferred embodiments of the invention utilize separate rings 14 and 26, with axially abutting faces (threads as shown) therebetween which can slip radially relative to each other to avoid high cyclic stresses.

FIG. 5 provides a perspective view of the above-described locking structure.

It will be apparent that the present invention makes possible generators of larger diameter by virtue of the fact that, the windings may be substantially downset in their end portions, while the rotor diameter may be substantially increased throughout its central portion without regard for the strength of the separating teeth members and a retaining ring of necessary smaller diameter may be attached to such a rotor again without consideration of the downset teeth members.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:

1. A cylindrical member having longitudinally extending teeth defining slots therebetween, a ring member disposed coaxially with said cylindrical member, and means to fix said ring member from axial movement relative to said cylindrical member, an improvement in said means comprising:
- a keyseat defined by said teeth transverse to the axis thereof,
- a circumferential keyway defined by the outer surface of said ring member,
- a plurality of locking members inserted in said keyseat and keyway, each extending the circular pitch of said teeth,
- a lock ring surrounding said cylindrical member to hold said locking members in place, and
- said locking members extending from the center of one tooth to the center of the next adjacent tooth.

2. The improvement according to claim 1 in which said ring member comprises a retaining ring and a hook ring defining said circumferential keyway, and means to mutually fasten said retaining ring and said hook ring.

3. A dynamoelectric machine rotor body having longitudinal teeth defining slots therebetween, said teeth having a diameter in the central portion of said rotor greater than in the end portions thereof,
- conductor bars extending along said slots, said teeth extending to a greater radius in the rotor central portion than in the rotor end portions,
- a ring member surrounding said teeth and said bars at each rotor end portion, and means to fix said ring member from axial movement relative to said rotor body, said means characterized by the following improvement:
- a keyseat defined by said teeth in an area of their greater diameter and transverse to the axis thereof,
- a circumferential keyway defined by the outer surface of said ring member,
- a plurality of locking members in mutual positive engagement with said keyseat and with said circumferential keyway, and
- a lock ring surrounding said rotor to hold said locking members in place.

4. The improvement according to claim 3 in which said ring member comprises a retaining ring and a hook ring defining said circumferential keyway between them, and means to mutually fasten said retaining ring and said hook ring.

5. The improvement according to claim 3 in which said slots in the end portions of said rotor are tapered in axial section, coextensive with their depth.

References Cited

UNITED STATES PATENTS

| | | | |
|---|---|---|---|
| 2,621,223 | 12/1952 | Vickers | 310—270 |
| 2,960,360 | 10/1960 | Taylor | 310—270 |
| 3,324,324 | 6/1967 | Richardson | 310—270 |
| 3,395,299 | 7/1968 | Quay | 310—261 |

FOREIGN PATENTS

| | | |
|---|---|---|
| 682,202 | 10/1939 | Germany. |

MILTON O. HIRSHFIELD, Primary Examiner

R. SKUDY, Assistant Examiner